United States Patent [19]
Roberts et al.

[11] Patent Number: 6,064,501
[45] Date of Patent: May 16, 2000

[54] METHOD OF DETERMINING OPTICAL AMPLIFIER FAILURES

[75] Inventors: Kim Byron Roberts, Herts, United Kingdom; Maurice Stephen O'Sullivan; Richard A. Habel, both of Ottawa, Canada; Christopher Brendan Kennedy, Nepean, Canada

[73] Assignee: Nortel Networks Corporation, Montreal, Quebec, Canada

[21] Appl. No.: 08/788,300

[22] Filed: Jan. 24, 1997

[30] Foreign Application Priority Data

Mar. 28, 1996 [CA] Canada ................................ 2172873

[51] Int. Cl.⁷ .................................................. H04B 10/08
[52] U.S. Cl. ........................ 359/110; 359/177; 359/179; 359/341; 372/6
[58] Field of Search ............................... 359/110, 173, 359/179, 177, 333, 341; 372/6; 370/241, 242, 252

[56] References Cited

U.S. PATENT DOCUMENTS

| | | | |
|---|---|---|---|
| 5,138,621 | 8/1992 | Goto et al. | 372/6 X |
| 5,245,690 | 9/1993 | Aida et al. | 372/6 X |
| 5,374,973 | 12/1994 | Maxham et al. | 359/341 |
| 5,379,143 | 1/1995 | Takano | 359/177 |
| 5,440,418 | 8/1995 | Ishimura et al. | 359/177 |
| 5,444,238 | 8/1995 | Gherardi et al. | 250/227.11 |
| 5,455,704 | 10/1995 | Mizuochi et al. | 359/179 |
| 5,654,816 | 8/1997 | Fishman | 359/177 |
| 5,703,711 | 12/1997 | Hamada | 359/341 |

FOREIGN PATENT DOCUMENTS

| | | |
|---|---|---|
| 0 618 691 | 10/1994 | European Pat. Off. |
| 0 652 613 | 5/1995 | European Pat. Off. |
| 0 703 678 | 3/1996 | European Pat. Off. |
| 2 268 852 | 1/1994 | United Kingdom . |

Primary Examiner—Thomas Mullen
Attorney, Agent, or Firm—Foley & Lardner

[57] ABSTRACT

The invention is directed to a failure detection system and method for detecting malfunction of an optical amplifier module with one or multiple transmission channels. The failure detection system comprises a unit for measuring a performance parameter of the module; a unit for providing an expected performance parameter; and a comparator unit for receiving the performance parameter and the expected performance parameter and producing an error signal when the performance parameter substantially departs from the expected performance parameter. The system also includes a display/alarm unit for receiving the error signal and accordingly signaling failure of the module. The performance parameter is an output value of the module; a correspondence between an output value and an input value for a transmission channel; a figure of merit ($FOM^{i-t}$); a set of gains (g) for all transmission channels; and the dynamic range of the amplifier module.

36 Claims, 13 Drawing Sheets

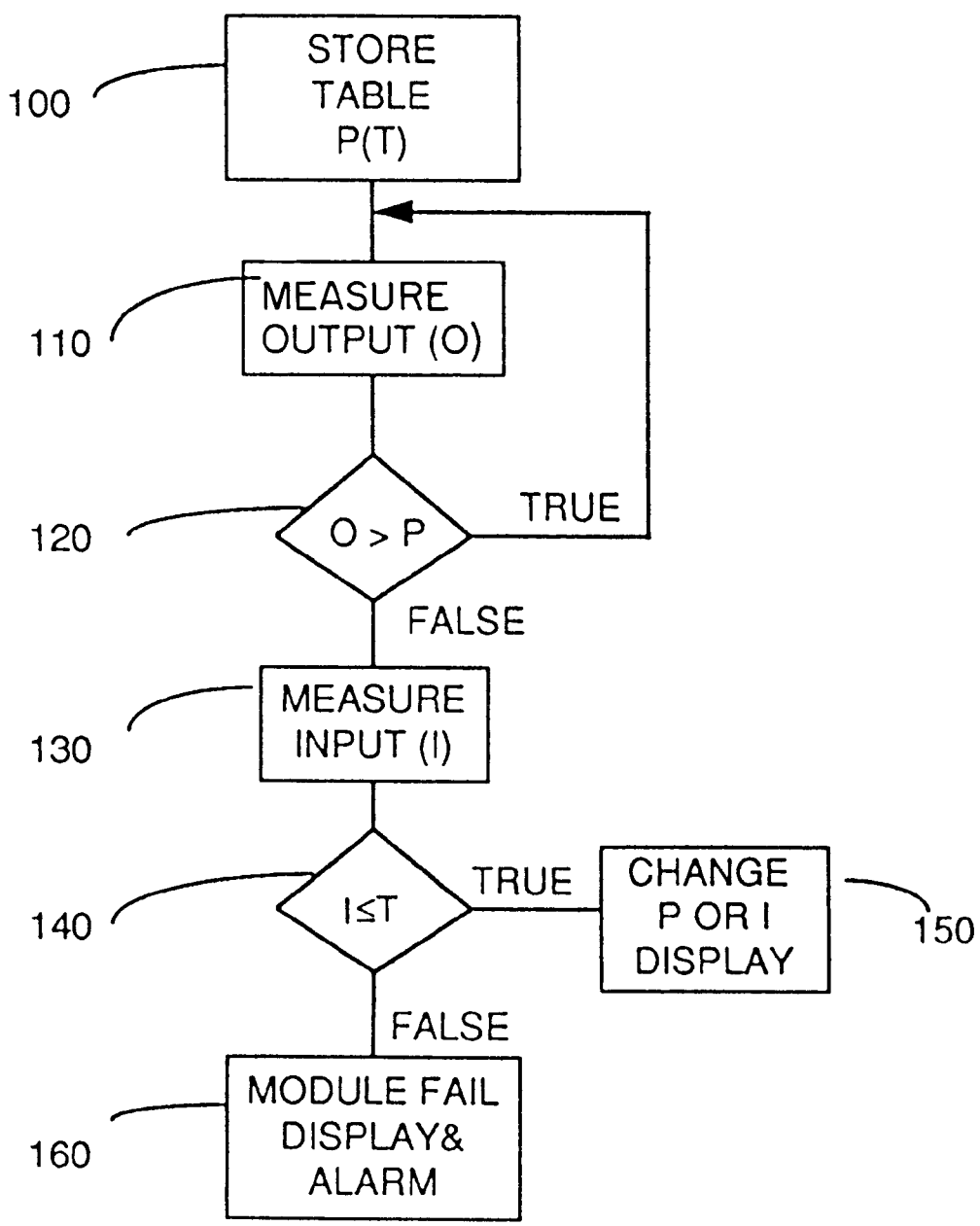

6,064,501

METHOD OF DETERMINING OPTICAL AMPLIFIER FAILURES

BACKGROUND OF THE INVENTION

1. Field of the Invention

This invention is directed to a method and device for measuring the performance of an optical amplifier and more precisely to a method of determining optical amplifier failures.

2. Background Art

Modern optical transmission systems comprise a transmitting and a receiving terminal connected through a strand of optical fiber. The optical signal is attenuated as it travels along the optical fiber, which limits the possible spacing of the terminals. To achieve long haul transmission at high line rates, regenerators (repeaters) and/or optical amplifiers are deployed along the optical transmission link in multiple locations, for boosting the signal on the fiber. For systems operating at data rates of a few GBps, regenerator sites could be spaced in the range between 35 to 80 Km, depending on the wavelength chosen for transmission. Typically, in the line amplifying configuration, the distance between the optical amplifiers may be almost doubled, being in the range between 80 to 160 Km. This distance is determined by the optical power launched into the fiber by the upstream amplifier, the loss and dispersion of the optical fiber interconnecting this amplifier with the closest downstream amplifier, and the sensitivity of the downstream amplifier.

The use of fiber amplifiers in long-distance systems is favored not only by the longer distances between the modules, but also because optical amplifiers do not require conversion of the optical signals traveling along the fiber into electrical signals and back, and also because they are spliced easily into the fiber transmission link. While the performance of opto-electronic regenerators may be measured by monitoring the characteristics of the regenerated electrical signal, measuring the performance of the optic amplifiers requires specific monitoring techniques, because regenerated electrical signals are not available.

In an optical amplifier there are some faults that degrade performance by increasing the optical noise rather than by decreasing the net gain. The increased optical noise causes bit errors at the terminals of the transmission system even though the received optical signal strength meets design objectives. Moreover, failures in the optical components of an amplifier may degrade the optical performance while not preventing the amplifier from obtaining the desired output power. It is valuable to detect these degradations as they can cause excessive noise, reduce margin in performance features, or be an advance warning of further failures.

The failures at an Erbium Doped Fiber Amplifier (EDFA) may be classified as electronics failures, pump laser failures and optical component failures. For example, variations of pump laser wavelength due to the aging or to malfunctions of the temperature control system can increase the optical noise. Excessive losses or total loss of the input signal need to be clearly detected, because such losses are generally compensated by higher gain toward the output port of the EDFA, so that the net effect is a decreased signal to noise ratio of the output signal.

The amount of gain that a given optical amplifier may generate is not only a function of the input power, but also a function of the output power due to saturation of the gain at higher powers. Currently, the output power levels in an optical amplifier can be provisioned by the user for allowing flexibility in the design configuration of the optical transmission system. Miscalculations in the design of transmission system configuration may occur in that, for example, a higher output power than the amplifier can give may be provisioned by the user.

When an optical amplifier is unable to obtain the desired output power it may be because the amplifier has degraded, because the input signal is too small for the desired output power, or it may be because the provisioned power set by the user is higher than the design parameter. It is valuable for the user of the system to be able to accurately distinguish these cases, should the desired output power not be obtained at any of the amplifiers in the transmission link.

When an amplifier has more than one output direction or band, and has the ability to control the power separately per band, then another problem can occur. The amplifier may run out of control dynamic range for a given set of input signal power levels, and not be able to simultaneously keep all of the output power levels at their provisioned values. One level may be too high and another too low, for example. This dynamic range is, in general, a function of the input power levels and the provisioned output power levels. It is valuable for the system manager to distinguish between a failure of an amplifier and a set of input and provisioned output conditions that the amplifier is not designed to satisfy.

Some faults are currently signaled. Thus, generating a loss of signal (LOS) alarm when the input signal has less power than a given threshold is standard practice in fiber-optic transmission equipment. As well, generating alarms when an amplifier is unable to meet the provisioned gain or, alternatively, the provisioned output power, is also known.

U.S. Pat. No. 5,513,029 (Roberts et al., issued Apr. 30, 1996 and assigned to Northern Telecom Ltd.) discloses a method of measuring the optical signal to noise ratio generated by an amplifier if the appropriate dither is present on the laser source.

However, the prior art generally fails to provide a method for detecting degradations and faults in the optical components of an amplifier, and distinguishing between equipment failures and lack of an input signal. The present invention is concerned with such methods and devices.

SUMMARY OF THE INVENTION

An object of the present invention is to provide methods and devices for monitoring performance of optical amplifiers which reduce or overcome some or all of the disadvantages of the monitoring techniques of the prior art.

Another object of this invention is to provide methods and apparatus for detecting degradations and faults in the optical components of an optical amplifier.

Still another object of this invention is to provide a method and apparatus which distinguish between equipment failures and an inadequate input signal.

According to one aspect, the invention provides a failure detection system for an optical amplifier module comprising means for measuring a performance parameter of the module, means for providing an expected performance parameter, and a comparator unit for receiving the performance parameter and the expected performance parameter, and for producing an error signal when the performance parameter substantially departs from the expected performance parameter.

According to another aspect, the invention provides a failure detection system for a multi-channel optical amplifier module having a plurality (M) of transmission channels comprising means for measuring a performance parameter of the module, memory means for storing an expected performance parameter, and a comparator unit for comparing the performance parameter with the expected performance parameter and producing an error signal when the performance parameter departs from the expected performance parameter.

Another aspect of the invention provides a method for detecting failure of an optical amplifier module, comprising the steps of: providing an expected performance parameter for the module, measuring a performance parameter of the module, comparing the performance parameter with the expected parameter to generate an error signal when the performance parameter is different from the provisioned performance parameter, and triggering an alarm/display unit with a true/false signal for indicating a failure of the module.

An amplifier may function for many years at an input power level that is below the guaranteed level due to the margin in the design. Only when degradation of one or more components reduces the margin is the amplifier unable to obtain the provisioned output power. A user may choose to set the threshold for declaring a loss of input (the LOS threshold) lower than the guaranteed level in order to take advantage of the margin in the design. In this way, the LOS threshold may be set too low for particular amplifiers at particular output power settings through user choice, or mistake, or lack of knowledge.

Advantageously, the method of the present invention ensures that whenever the amplifier fails to obtain an expected performance parameter, an alarm is always generated and, moreover, the appropriate alarm which distinguishes between the loss of input and the failure of optical components is generated.

The performance parameter determined according to this invention is, for example, the output power or gain. As well, the present invention proposes the use of a figure of merit, which is a more subtle measure of amplifier performance than gain or output power, to rate the potential performance of an amplifier. In this way, a better fault coverage can be provided, and potential problems can also be detected before the gain or output power is affected.

Using the expected amount of amplified spontaneous emission (ASE) level and comparing it with the measured noise, as well as calculating the gain tilt according to the methods of the present invention, also provides more accurate evaluation of the amplifier performance than just the measure of the added noise and gain. The comparison of the predicted characteristic to the measured one removes the significant variation in the noise or gain profile which is normal in the amplifier, thus allowing any degradation to be accurately observed and appropriate action initiated.

In addition to the advantages listed above, the method according to this invention removes from the user the burden of fully understanding the dynamic range of a multi-band amplifier, which can be a relatively complex function of many variables. This is because the amplifier itself evaluates the circumstances of a dynamic range failure.

BRIEF DESCRIPTION OF THE DRAWINGS

The foregoing and other objects, features and advantages of the invention will be apparent from the following more particular description of the preferred embodiments, as illustrated in the drawings.

FIG. 1B is a flow chart of a method for determining failure of the optical amplifier module of FIG. 1A;

DESCRIPTION OF THE PREFERRED EMBODIMENT

Figure 1A:
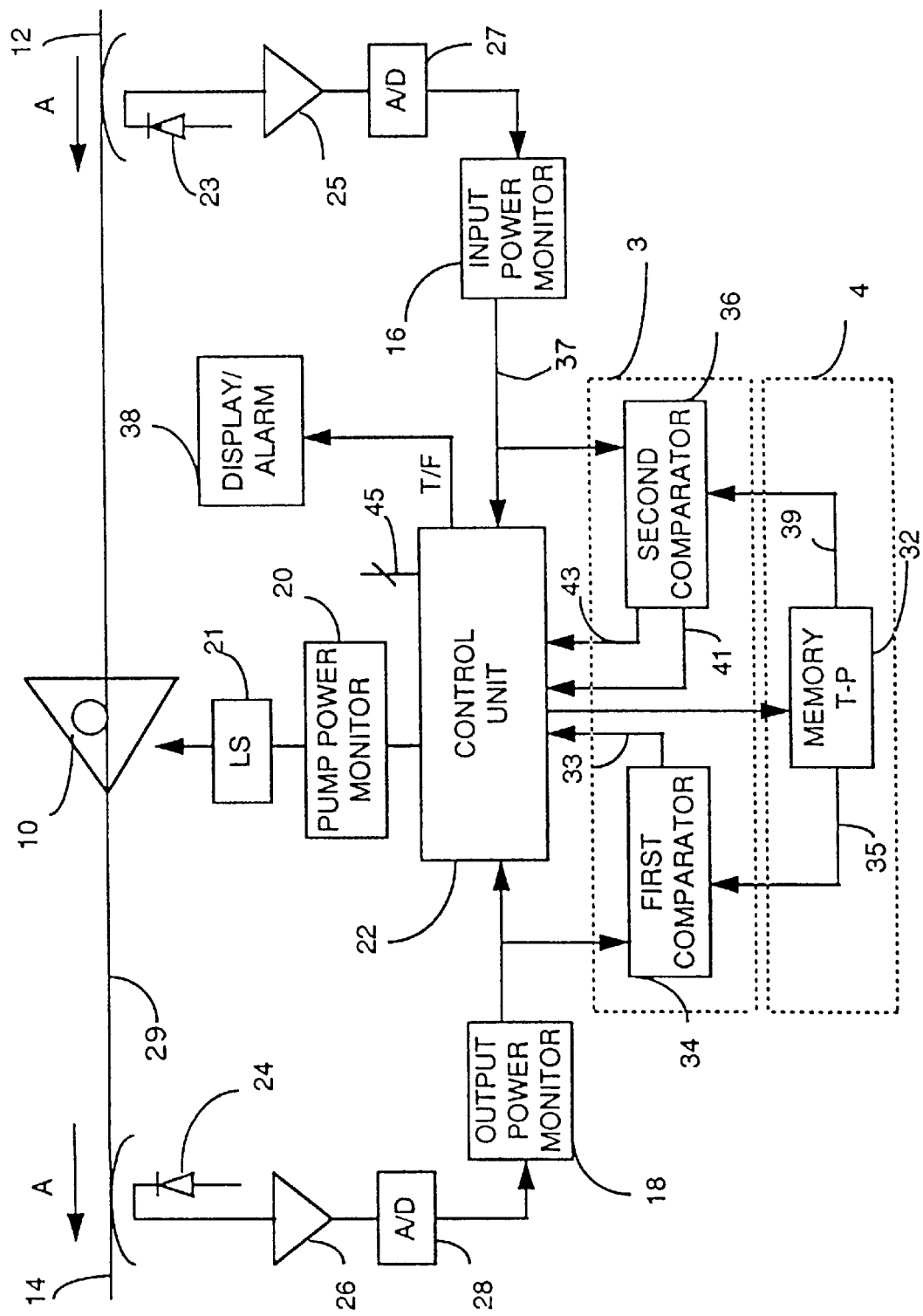
FIG. 1A shows a block diagram of a unidirectional amplifier module equipped with a failure detection system according to this invention.

The block diagram of an unidirectional/uni-channel optical amplifier module equipped with a failure detection system is illustrated in FIG. 1A. The optical amplifier module comprises an optical amplifier 10, which in the example of FIG. 1A is an Erbium doped fiber amplifier (EDFA). The amplifier module is connected into optical fiber 29 for amplifying an incoming optical signal received at input port 12 to obtain an outgoing optical signal at output port 14. The EDFA module conventionally comprises an input power monitor 16, an output power monitor 18 and a pump power monitor 20. The output power monitor 18 receives a fraction of the outgoing optical signal after it was converted to an output electrical signal, and measures the power in the outgoing optical signal. This feedback power information is processed by a control unit 22 which also controls the pump power monitor 20 for adjusting the power of the laser pump 21 according to the feedback signal. The input power monitor 16 measures the power of the incoming optical signal, which measurement is then used for determining various parameters of the amplifier. For example, the input power may be used to obtain noise information, as disclosed in the aforementioned U.S. Pat. No. 5,513,029. Control unit 22 exchanges information with a remote or local computer along data bus 45.

An input and output tap are conventionally used at input and output ports 12 and 14 to divert a fraction of the incoming and outgoing optical signals to the respective power monitor. The respective tapped fraction is converted to an electrical signal by PIN diodes 23, 24, then amplified by transimpedance amplifiers 25, 26 and converted to a digital signal by analog to digital converters 27, 28. This method of measuring the power of optical incoming and outgoing signals is known in the art and therefore further details are not provided here.

Generally, an optical amplifier module is provided with an alarm that declares a LOS when the input signal is less than a threshold level. If an optical amplifier is unable to obtain its provisioned output power such as determined by the output power control loop while the pump laser is driven to its limit, an internal alarm state is declared. This is not sufficient, as there are various reasons why the output power may not be obtained and, accordingly, various ways of correcting this situation or declaring an appropriate alarm.

According to this invention, the optical amplifier module is equipped with a failure detection system comprising means for measuring a performance parameter of the module, means for providing an expected performance parameter; and means for comparing the measured performance parameter with the expected performance parameter, to provide an error signal. The error signal triggers appropriate alarms; a display of the type of error may also be provided.

In the embodiment of FIG. 1A, the performance parameter is preferably a correspondence between the output and input powers for a transmission channel. The input power monitor 16 provides a measured input value (I) on line 37 as a function of the power of the optical incoming signal, and the output power monitor 18 provides the measured output value (O) on line 31 as a function of the power of the outgoing optical signal. The expected performance parameter is a provisioned output power (P) corresponding to a threshold value (T) for the input (I) necessary to obtain the respective output (O). Preferably, the means for providing 4 is a memory 32 which stores a correspondence between (P) and (T). Memory 32 could be a non-volatile type of memory, in which case the expected parameter(s) may be stored by the manufacturer, and cannot be modified by the user.

The means for comparing 3 comprises a first comparator 34 for comparing the measured output value (O) with the provisioned value (P) received on line 35 and producing an error signal 33, indicating that the amplifier output is less than the provisioned value. This may be part of the output power control loop.

Before declaring a module failure, the system determines if sufficient input power is provided for obtaining the provisioned output power, independent of the LOS thresholds that may have been provided. Thus, if signal 33 indicates that the output power is too low, a second comparator 36 compares the measured input value (I) with the threshold input value (T) retrieved from memory 32 on line 39. If the measured input value (I) is below the threshold, then an "Input Low" alarm 41 is generated, indicating that the user is expecting too much gain from the amplifier. This would be caused by the input power being too low, or the provisioned output power being too high. If the input power is above the threshold, then a "Unit Fail" alarm 43 is generated, indicating that the amplifier is not functioning to its guaranteed performance level.

The failure detection system is also provided with a display/alarm unit 38 for indicating a failure of the module when (O) is less than (P) and also for indicating if it is a module failure or an input low situation.

It is to be understood that control unit 22 exchanges control signals with the input power monitors 16 and 18, comparators 34 and 36 and memory 32. These signals are not illustrated for brevity of the drawings.

FIG. 1B illustrates the method for determining failure of an unidirectional/uni-channel amplifier module. During the initialization step 100 the provisioned output (P) and the corresponding threshold value (T) are stored in memory 32. The correspondence can also be a table giving a plurality of expected power values, each paired with a corresponding threshold for the input. The power of the output signal is measured in step 110 to give the measured output value (O). Next, in step 120, the provisioned power (P) is retrieved from memory 32 and compared with the measured output value (O) in comparator 34. If output value (O) is greater or equal to the provisioned value (P), steps 110 and 120 are repeated, as the module functions according to the provisioned parameter.

If signal 33 is false, the measured input value (I) is determined by the input power monitor 16 in step 130. In step 140 the threshold value (T) is retrieved from memory 32 and compared with the measured input value (I) in the second comparator 36. If comparator 36 issues control signal 41, control unit 22 determines that in this case the incoming optical signal is too low, or the provisioned power is too high and block 38 will display the appropriate indication in step 150. If comparator 36 issues control signal 43, the control unit 22 interprets it as a module failure and accordingly instructs alarm block 38 to trigger the appropriate alarm in step 160.

Figure 2A:
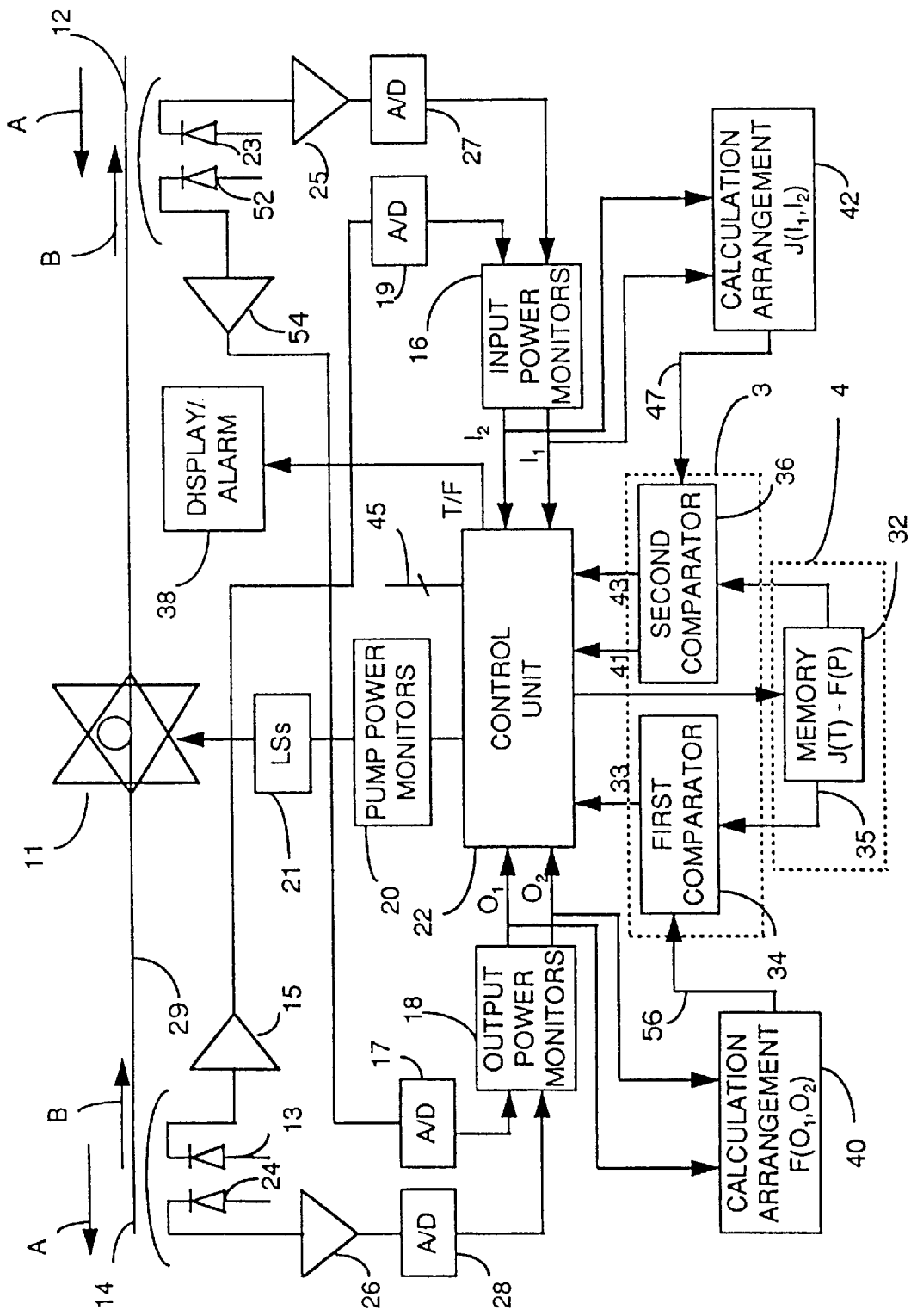
FIG. 2A shows a block diagram of a bidirectional amplifier module equipped with a failure detection system.

In a bidirectional optical amplifier, or in a multi-channel amplifier, the above method can be applied separately for each direction/channel. FIG. 2A illustrates a case when this method is applied to a bidirectional amplifier module using a combined performance parameter. The amplifier module of FIG. 2A is provided with separate power monitors and laser sources for each direction. FIG. 2A illustrates one block 16 for both input power monitors, one block 18 for the output power monitors, one block for the pump monitors and one laser source block, for simplification.

The incoming optical signal for a first direction A, illustrated in this Figure from right to left, is tapped at input port 12, converted to an electrical analog signal by the PIN diode 23 and transimpedance amplifier 25, converted then to a digital signal by analog to digital converter 27, and applied to the input power monitor unit 16 to produce the measured input value ($I_1$). The outgoing optical signal for the first direction A gives the first measured output value ($O_1$) along the path made of PIN diode 24, transimpedance amplifier 26, analog to digital converter 28 and output power monitor unit 18.

The incoming and outgoing optical signals for the second direction of transmission (or the second channel) B, illustrated in FIG. 2A from left to right, are also measured. A second measured input value ($I_2$) is obtained along the path made of PIN diode 13, transimpedance amplifier 15, analog to digital converter 19 and input power monitor unit 16. The corresponding measured output value ($O_2$) is obtained along the path made by the PIN diode 52, transimpedance amplifier 54, analog to digital converter 17 and output power monitor unit 18. The control unit 22 receives the information regarding the power of the incoming and outgoing optical signals and controls each pump power monitor 20 for setting the power of laser sources 21 to obtain the desired amplification for the respective direction (channel). Other parameters of the module are monitored by the control unit. As in the embodiment of FIG. 1A, control unit 22 exchanges information with a computer on data bus 45.

The first and second output values ($O_1$) and ($O_2$) are applied to a first calculation arrangement 40 which calculates a combined measured output signal F(O) on line 56, which is a function $F(O_1, O_2)$. A second calculation arrangement 42 receives the measured input values ($I_1$) and ($I_2$) and calculates a combined measured input signal J(I) on line 47, as a function $J(I_1, I_2)$.

Memory 32 stores a direct correspondence between the provisioned combined output F(P), which is the same function F of the provisioned output powers for the two directions (channels), and a combined threshold J(T), which is the same function J of the thresholds for the two directions (channels).

The first comparator block 34 receives the measured and provisioned combined outputs and produces the error signal 33 indicating that the output power is too low, as disclosed above in connection with FIGS. 1A and 1B. If $F(O_1,O_2)$ is less than F(P), the second comparator 36 compares the combined measured input $J(I_1,I_2)$ with the combined threshold J(T). If the combined measured input is greater than the combined threshold J(T), then the "Unit Fail" alarm 43 is generated and display/alarm unit 38 indicates that the amplifier is not functioning to its guaranteed performance level. If the combined measured input value is below the threshold, then the "Input Low" alarm 41 is generated and display/alarm unit 38 indicates that the user is expecting too much gain from the amplifier.

Figure 2B:
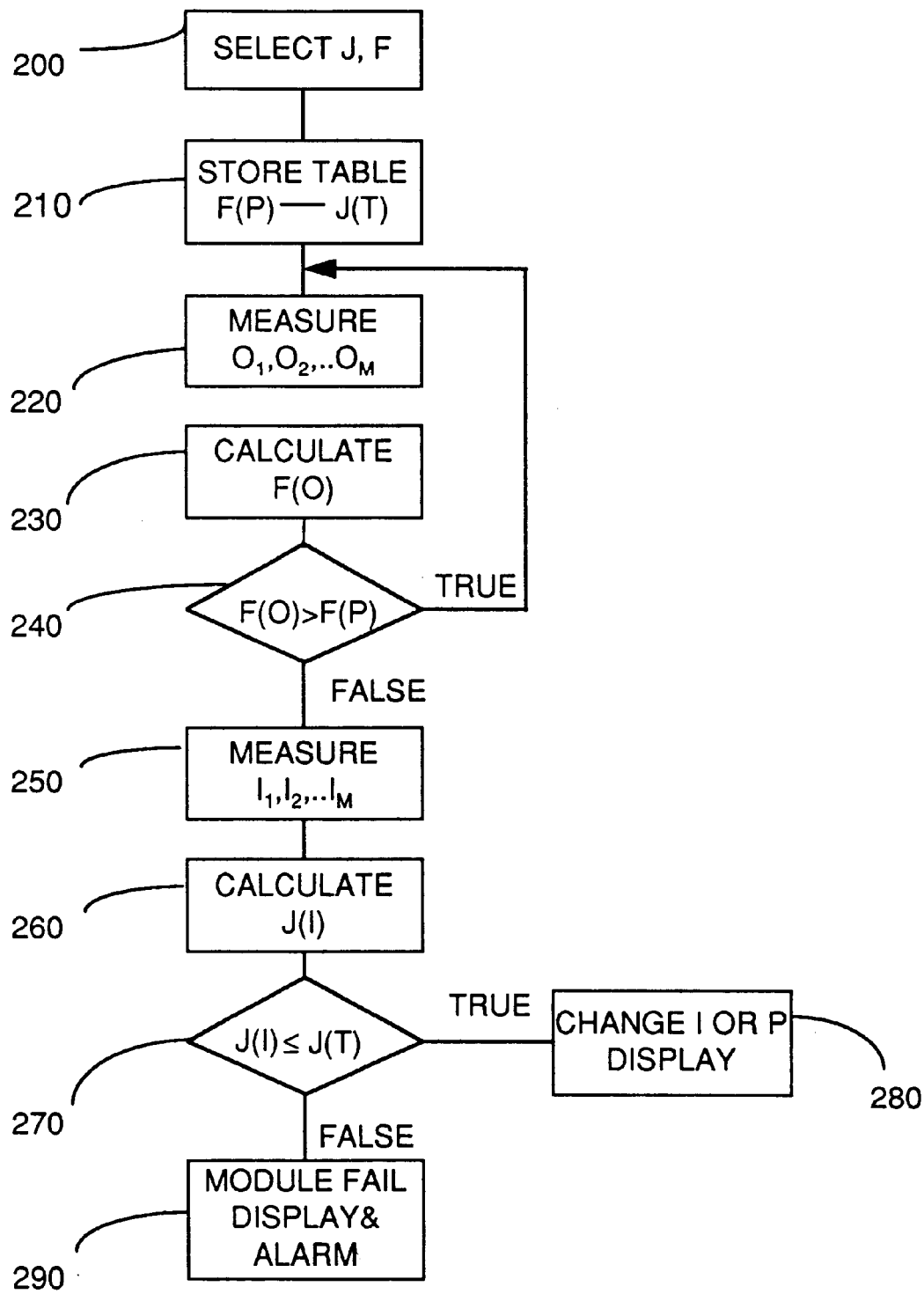
FIG. 2B is a flow chart of a method for determining failure of the optical amplifier module of FIG. 2A.

FIG. 2B illustrates the flow chart for the operation of a failure detection system for a multi-channel optical amplifier module as illustrated in FIG. 2A for two channels. Functions F and J are selected in step 200, and in step 210 the correspondence between the calculated combined provisioned output power F(P) and the combined threshold J(T) is stored in memory 32. Next, in step 220, fractions of the outgoing optical signals for all M transmission channels are diverted to the output power monitor block 18 and processed to determine the output values $O_1, O_2, \ldots O_m, \ldots O_M$. Function $F(O_1,O_2, \ldots O_m, \ldots O_M)$ is calculated in the first calculation arrangement block 40 in step 230 for obtaining the combined measured output power F(O). For two transmission channels as shown in FIG. 2A, the calculation arrangement 40 determines the function $F(O_1, O_2)$.

If in step 240 it is determined that the combined measured output F(O) is equal or greater than the combined provisioned output power F(P) retrieved from the memory, the module functions within the provisioned parameters and steps 220, 230 and 240 are repeated for continuous monitoring of failures. If it is determined that the combined measured output F(O) is smaller than the combined provisioned output F(P), the system checks if the input power is sufficient for obtaining the provisioned output power. The measured input values are provided by the input power monitor 16 in step 250. The measured input values are applied to the second calculation arrangement 42 where the function $J(I_1,I_2, \ldots I_m, \ldots I_M)$ is calculated to provide the combined measured input value J(I) in step 260. For the case when the transmission system has two transmission channels as shown in FIG. 2B, the second calculation arrangement block 44 calculates function $J(I_1,I_2)$.

Next, in step 270, J(T) is retrieved from memory 32 and compared with J(I) to verify if the incoming signal is above a threshold for obtaining the provisioned power for the outgoing signal. If J(I) is smaller than J(T), the system informs the user that the input power is too low, or that the provisioned power is too high, as illustrated in step 280. Block 36 generates signal 41 and the control unit 22 displays the appropriate information on the alarm/display block 38. On the other hand, if J(I) is greater or equal to J(T), the control unit 22 triggers alarm block 38 to inform the user of a module failure in step 290.

Functions F and J may be the sum of the two input or output values. Other mathematical functions such as maximum can also be used in place of the sum. Hysteresis of, for example, 1 dB can be implemented to prevent excessive toggling of alarm states. Interpolation can be used to provide better resolution than that chosen for the table step-size, which could be, for example, 2 dB. A polynomial fit or other method of data reduction can be used instead of a table to require less storage at the cost of more processing. As well, it is possible to store in memory 32 a table with provisioned outputs for the inputs for each channel and have the calculation arrangement to determine functions F(P) and J(I) according to the number of channels in actual use. The preferred embodiment depends on the application.

Figure 3:
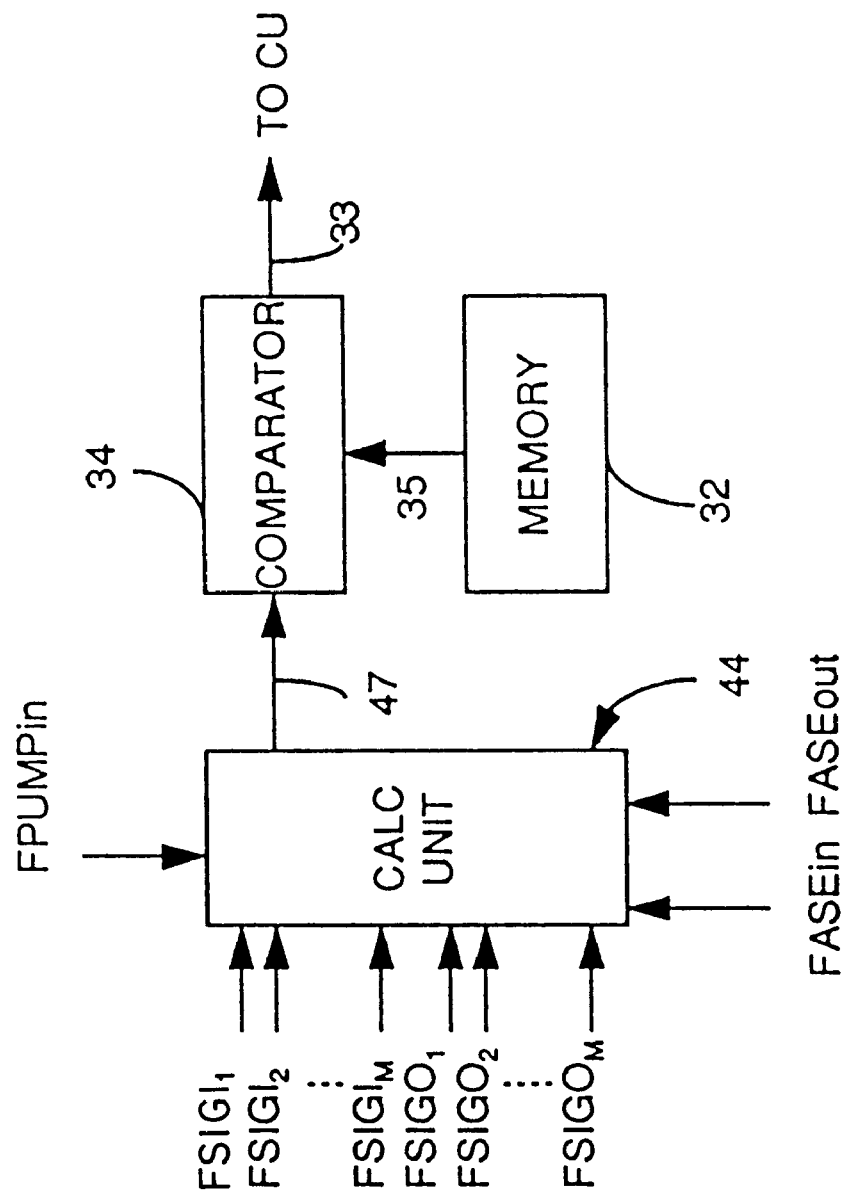
FIG. 3 shows a block diagram of a failure detection system according to another embodiment.
Figure 4A:
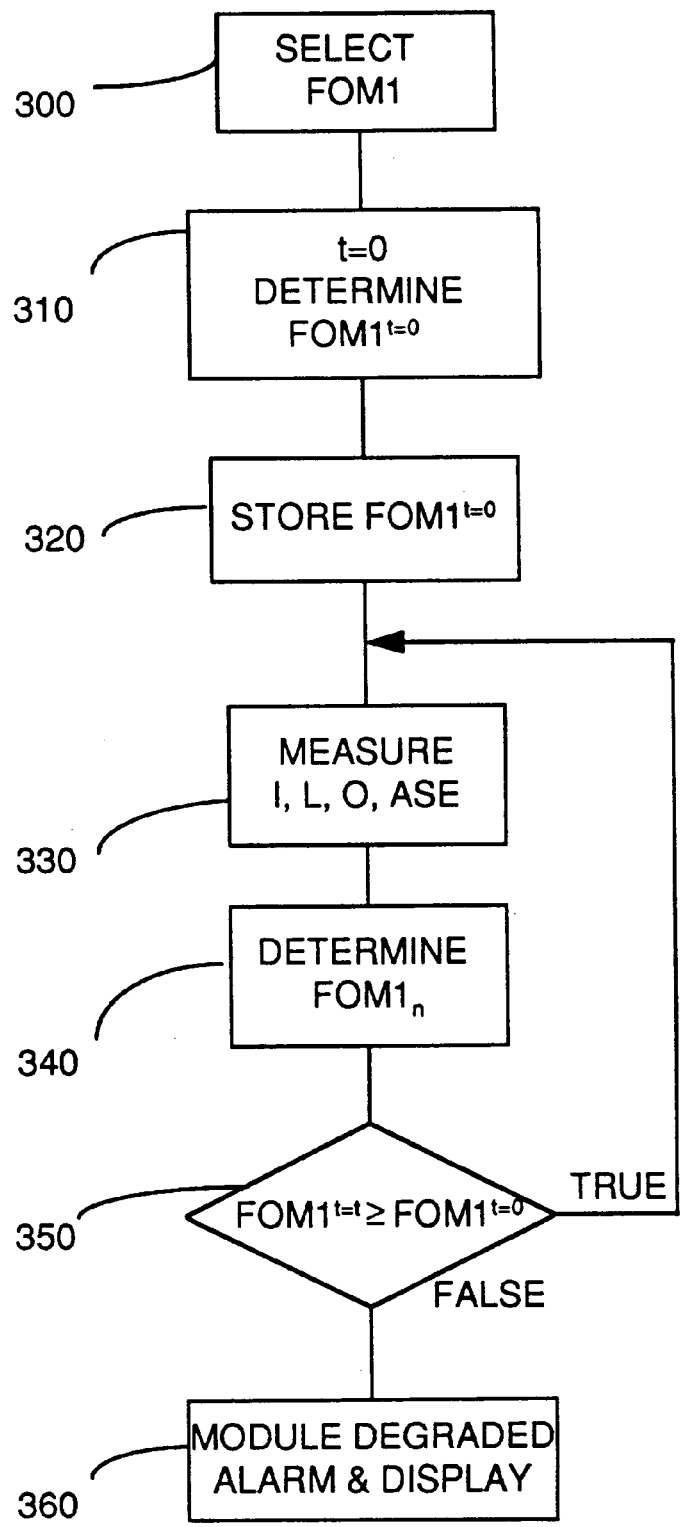
FIG. 4A is a flow chart of a method for determining failure of the optical amplifier module equipped with the failure detection system of FIG. 3.

FIGS. 3 and 4A illustrate a failure detection system for an optical amplifier module as described next.

Input and output signal powers are measured and signal wavelengths recognized for example by the method disclosed in U.S. Pat. No. 5,513,029 (Roberts et al.). These power values are converted by control unit 22 to photon flowrate values $FSIGI_1$ to $FSIGI_M$ and $FSIGO_1$ to $FSIGO_M$ for the input and output signals at wavelengths $\lambda_1$ to $\lambda_M$ respectively. Similarly, amplified spontaneous emission (ASE) power values, measured by any suitable method as disclosed, for example, in the above-identified U.S. patent application, are converted by the control unit to flowrates FASEin and FASEout. In addition, the pump back facet monitor current value (L) is converted by control unit 22 into a pump photon flowrate value FPUMPin.

All above conversion factors are worst case values, common to all amplifier units and obtained from a prior knowledge of the amplifier design. Using flowrates obtained at start of life, slowly varying monotonic functions FOM1 are evaluated and stored in non-volatile flash memory 32 accompanying each amplifier unit. In particular:

$$FOM = 1 - \frac{FPUMP_{in} + 2 \cdot (FASE_{in} - FASE_{out}) + \sum_{n}^{M}(FSIGI_n - FSIGO_n)}{\sum_{n}^{M} FSIGI_n + FPUMP_{in} + FASE_{in}} \quad (EQ1)$$

This expected figure of merit can be determined in the factory, once the amplifier has passed detailed optical tests, and then the figure of merit and some of the test results can be stored in the non-volatile memory 32 of each amplifier. The figure of merit can be reported to the user or to a factory repair person. Pass/fail criteria applied to the function FOM1 evaluated at start of life (t=0), can be used to identify modules suspected of unacceptable pump performance or to determine modules with unacceptable performance.

An error signal obtained from the difference between start of life values, $FOM1^{t=0}$, and corresponding values measured during the "in service lifetime" of the amplifier, $FOM1^{t=t}$, can be used to measure deterioration in pump laser efficiency. In particular:

$$\text{epump} = FOM1^{t=0} - FOM1^{t=t} \quad (EQ2)$$

To this end, the current figure of merit is compared in comparator 34 with the provisioned (start) value retrieved from memory 32. Pump efficiency deterioration is measured as an increase in the value of epump. Alarms can be derived using this error signal. As well, epump could be evaluated for a particular channel n, or could be a combination of n values.

Pump efficiency can deteriorate due to such things as a change in pump wavelength, change in optical path or alignments, and component losses. If the optical performance of the amplifier is degraded, such as by increased internal losses, changes in coupling, or changes in pump wavelength, then this figure of merit will be reduced, namely the measured FOM will be smaller than the provisioned value. In this case, error signal 33 informs the control unit 22, which in turn triggers the appropriate alarm, and/or displays a corresponding message.

FIG. 4A illustrates the flow-chart for the operation of the failure detection system of FIG. 3. In step 300, the definition of the figure of merit FOM1 is established, and in steps 310 and 320 the expected FOM1$^{t=0}$, which is the start value, is determined and stored in memory 32. In step 330, the input and output powers are measured together with the ASE power value. The values FSIGI$_n$ and FSIGO$_n$ are determined by the control unit 22 from these measurements. The current FOM1 is calculated in block 44 in step 340 and compared in step 350 with the start value FOM1$^{t=0}$ in comparator 34 to generate the epump signal 33. If the expected FOM1$^{t=0}$ is smaller than the measured value, the control unit 22 triggers alarm block 38 to indicate and display that the module has degraded its performance and service or replacements are necessary.

Figure 4B:
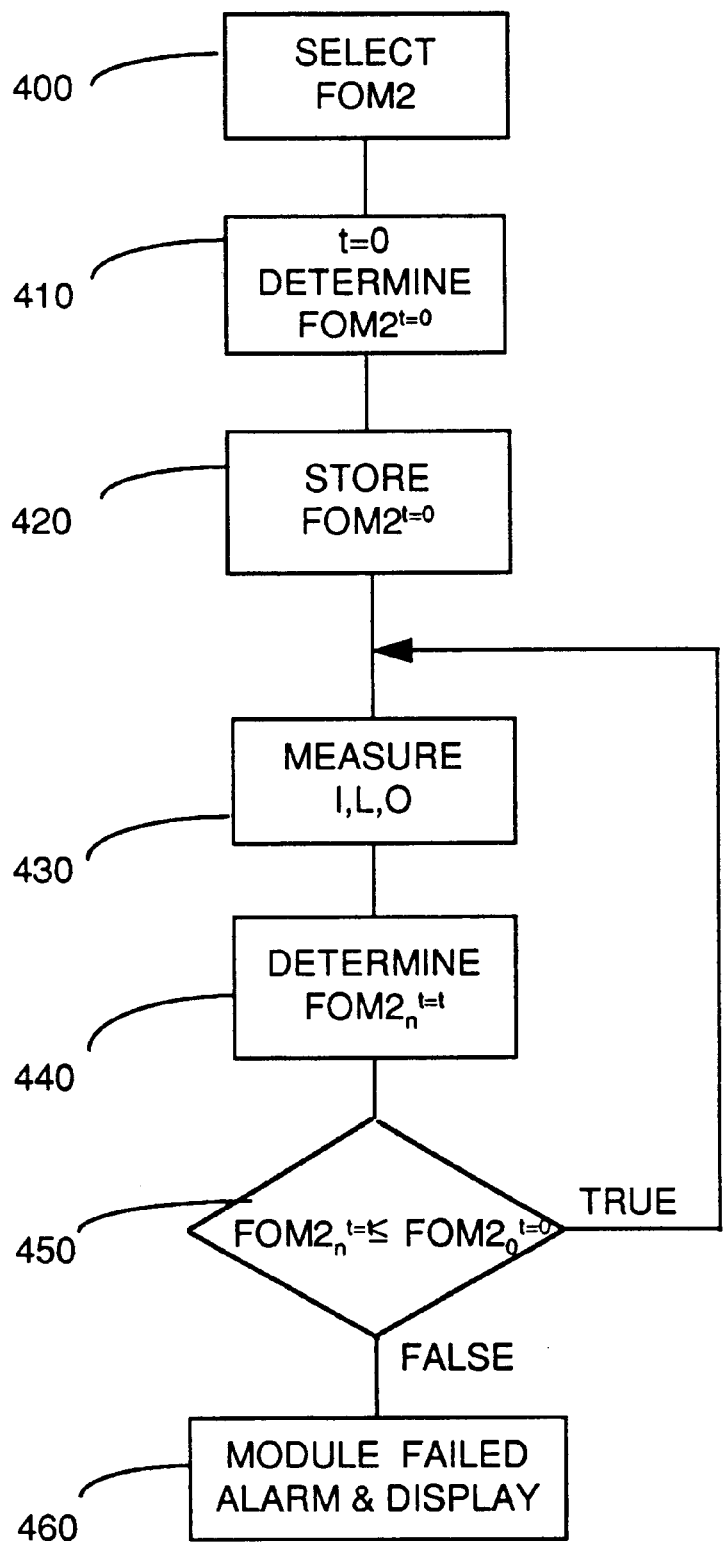
FIG. 4B is a flow chart of another method for determining failure of the optical amplifier module equipped with the failure detection system of FIG. 3.

Another parameter that may be measured for determining the performance of an optical amplifier module is the amplified spontaneous emission (ASE). The basic embodiment for detecting a module failure based on this parameter is illustrated in FIG. 3. FIG. 4B shows the block diagram for the operation of this embodiment.

The expected amount of ASE can be calculated in a calculation unit 44 using the input power and the pump power from the input power monitor 16 and the pump power monitor 20. A function FOM2$_n$ determines the effective input loss of the optical amplifier, or, equivalently, the amount of amplified spontaneous emission. Knowing the effective input loss is equivalent to knowing the amount of amplified spontaneous emission for a given amplifier design because the effective input loss adds directly to the noise figure of the amplifier. In particular:

$$FOM2_n = \frac{(FASE_{out} - FASE_{in}) \cdot FSIGI_n}{FSIGO_n} \quad (EQ3)$$

FOM2$_n$ is evaluated at start of life and stored in non volatile flash memory 32. Higher values of FOM2 correspond to a higher input loss for a given amplifier design.

The error signal 33 output by comparator 34 is obtained from the difference between start of life values, FOM2$_n^{t=0}$ and corresponding values measured during the amplifier's in-service lifetime, FOM2$_n^{t=t}$. Error signal 33 can be used to measure deterioration in input loss. In particular:

$$eloss = FOM2_n^{t=t} \cdot \frac{FSIGO_n}{FSIGI_n} - FOM2_n^{t=0} \cdot \frac{FSIGO_n}{FSIGI_n} \quad (EQ4)$$

Input loss deterioration is measured as an increase in the value of eloss$_n$. Alarms can be derived from signal 33 evaluated at a particular n or a combination of n values.

FIG. 4B illustrates the block diagram for the operation of the embodiment of FIG. 3 in detecting module failure based on ASE measurements. First, in step 400, function FOM2 is selected and the start values FOM2$^{t=0}$ (at t=0) are determined in step 410. This value is determined using input (I) from input power monitor 16, the value of the output ASE from the output power monitor 18, and the value of the input ASE from the pump power monitor 20. In step 420 the start values are stored in memory 32. Next, in step 430, the module measures the input (I), output (O) and pump (L) powers, and calculation unit 44 determines in step 440 the current value for FOM2$_n$. The measured value of the figure of merit at time t is compared with the start value in step 450 in comparator 34 to produce the error signal 33 for the control unit 22. If signal 33 indicates that the current figure of merit FOM2$_n$ is smaller or equal to the start value FOM2$_n^{t=0}$, steps 430 to 450 are repeated, in that the amplifier functions within the provisioned parameters. When the noise becomes greater than the expected ASE, failure of the module is declared by the alarm/display unit 38 in step 460.

Figure 5A:
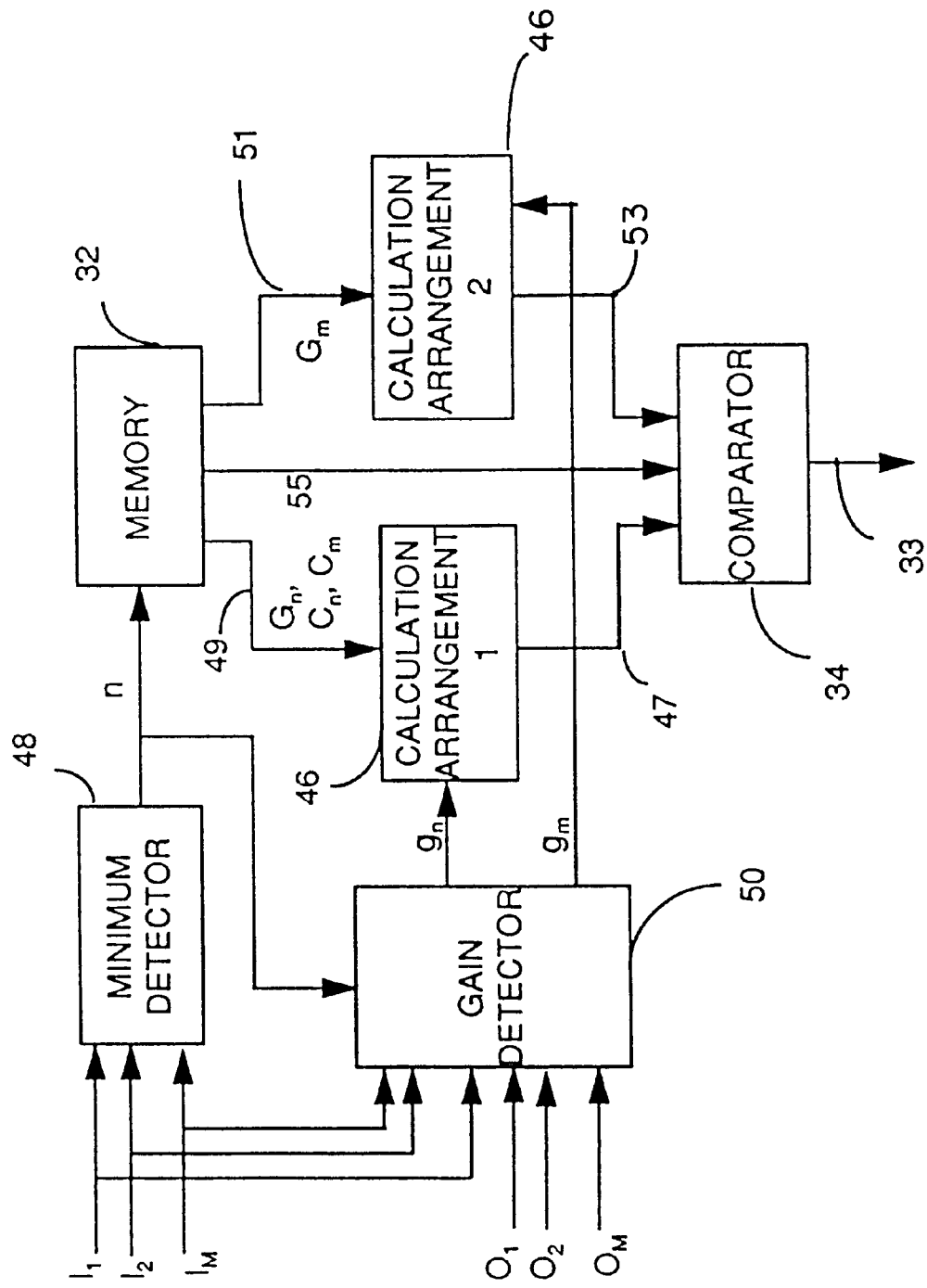
FIG. 5A shows a block diagram of a failure detection system according to another embodiment.

The gain tilt may also be used as the parameter of the amplifier for measuring its performance, as shown in the embodiment of FIG. 5A. The preferred implementation of the gain tilt calculation is described in the following.

There is a predetermined set of wavelengths at which a given amplifier unit operates, namely wavelengths $\lambda_1$ to $\lambda_M$. The gains $G_1$ to $G_M$ (decibels) at each of the wavelengths $\lambda_1$ to $\lambda_M$ are measured in the factory under a nominal gain condition of, for example, 23 dB at 1557 nm. The gains are then saved in non-volatile flash memory 32 on that amplifier module.

When the amplifier inversion condition changes away from nominal due to a change in the input powers or in the pump powers provided, the gains at each wavelength change in different, but predictable relative amounts. For a given amplifier design, there is a fixed set of tilt coefficients $C_1$ to $C_M$ (decibels/decibel) that define the normal relative changes in gain. These coefficients are also saved in the flash memory 32 within each amplifier module, so that they can be used to distinguish normal gain changes from abnormal ripple. In addition, a given error threshold (T) provided by the manufacturer is also stored in memory 32.

The gain tilt error is calculated as follows:

$$e_m = (g_m - G_m) - (gn - G_n) \times (C_m/C_n) \quad (EQ5)$$

where m is an integer, m $\in [1,M]$ and where: n is the smallest wavelength number of those present; $g_m$ is the present gain for channel (m); and $G_m$ is the expected gain for channel (m).

FIG. 5A illustrates a block diagram of an embodiment for determining a failure of the amplifier using the gain tilt error calculated according to relation EQ5. Periodically, or on request while in operation, the current gains $g_1$ to $g_M$ being provided by the amplifier are measured with gain detector 50 for the wavelengths that are present. Then, the system determines which is the smallest wavelength number of those present, using a minimum detector 48. The number of this channel is denoted by "n" and the channel for which the measurements are performed is denoted by "m". The expected gain of (n) channel $G_n$ is retrieved from memory 32 on line 49, together with the respective gain tilt coefficients $C_n$ and $C_m$, and applied to a first calculation arrangement 44. Then the first term $(g_n - G_n)C_m/C_n$ is determined by unit 44. At the same time, a second calculation arrangement 46 receives from memory 32 the expected gain $G_m$ for the channel under consideration and receives from the control unit the measured gain $g_m$. The second calculation arrangement determines the second term $(g_m - G_m)$. The first and second terms are applied on lines 47 and 53, respectively, to comparator 34.

If any error, or a function of the errors such as the sum of the absolute values is beyond the threshold (T) received on line 55, then the error signal 33 will trigger a gain ripple alarm. This alarm indicates that the ripple in the gain of that amplifier is excessive due to a failure in a component such as an optical filter and that the amplifier needs to be replaced.

An improvement of this method is to use a least squares best fit profile to determine a performance parameter $g_0$ for gain, rather than using one of the signal gains $g_n$. The best fit calculation is the well known minimization of the sum of the squares of the errors. This implementation is more tolerant to gain measurement errors by being a best fit to a plurality of measurements, rather than being leveraged from a single point. Wavelength zero could be selected, for example, as an arbitrary reference point such as 1545 nm that is not a signal wavelength. $C_0$ is set to 1.0 by scaling the array. The error equation then becomes:

$$e_m = (g_m - G_m) - (g_0 - G_0) \times C_m \tag{EQ6}$$

Figure 5B:
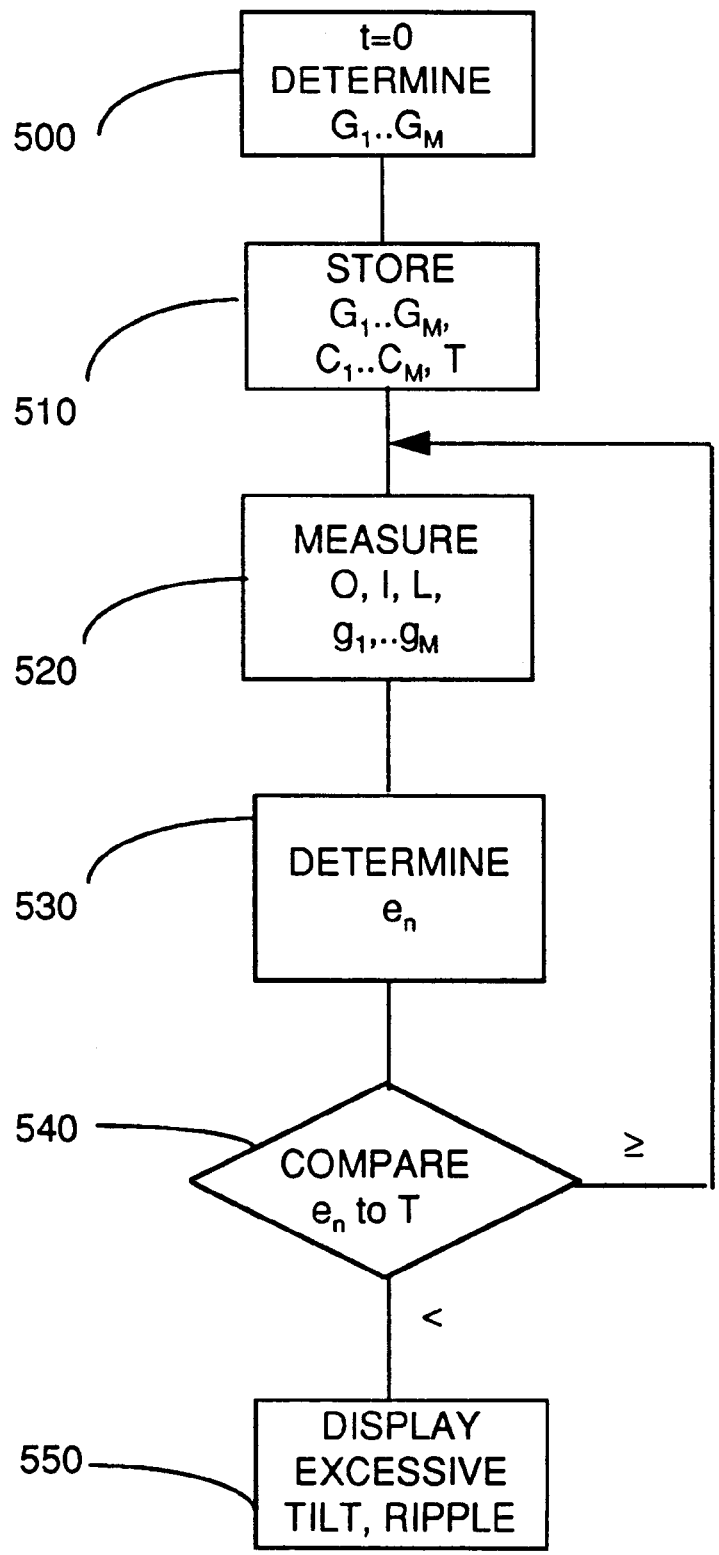
FIG. 5B is a flow chart of a method for determining failure of the optical amplifier module equipped with another embodiment of the failure detection system of FIG. 5A.

FIG. 5B shows the operation of this embodiment. In step 500 the gains $G_1$ to $G_M$ for each wavelength are determined for the respective module at a nominal gain condition of 23 dB at 1557 nm, for example. The gains are then saved in non-volatile flash memory 32 in step 510 as the expected performance parameter. Tilt coefficients $C_1$ to $C_M$ that define the normal relative changes in gain are also stored, together with an admissible error threshold. In step 520, the input, output and pump powers are measured and the current gains $g_1$ to $g_M$ are determined therefrom, also using the gain tilt coefficients. The error is calculated in step 530 according to EQ5 or EQ6, for example. If the error is beyond the threshold as determined in step 540, the control unit 22 declares a fault in the module and triggers the alarm block 38 in step 550.

Figure 6A:
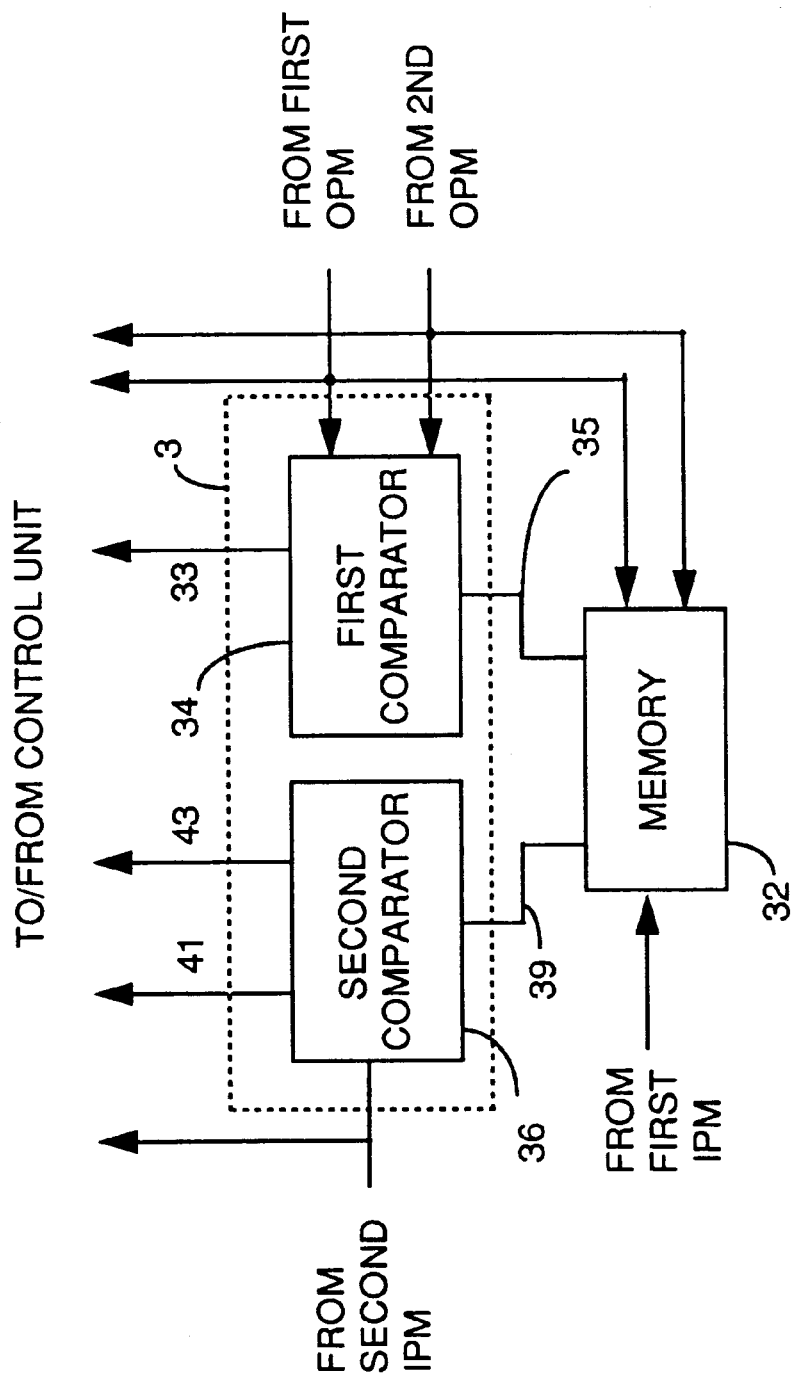
FIG. 6A shows a block diagram of a failure detection system according to yet another embodiment.
Figure 6B:
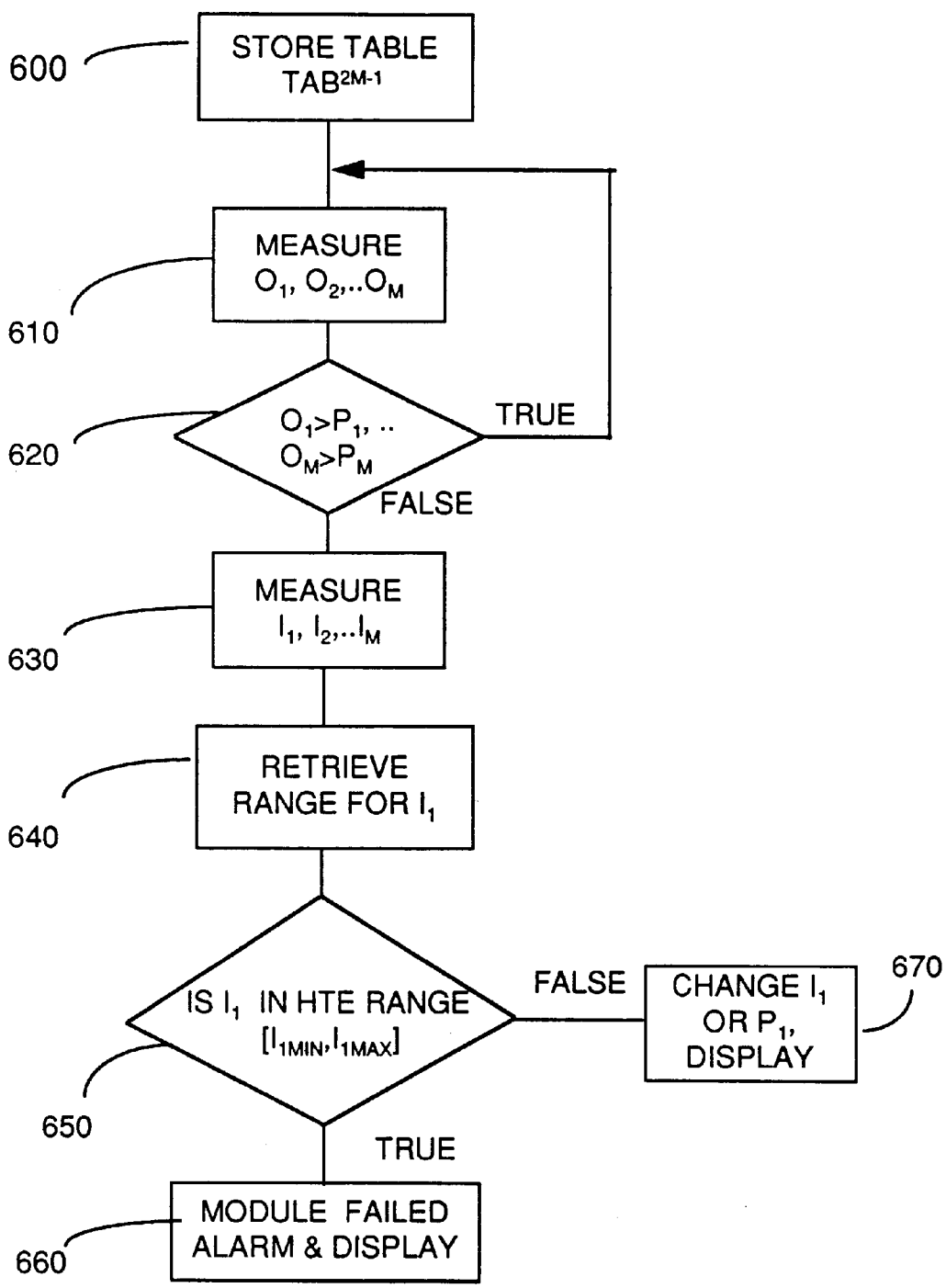
FIG. 6B is a flow chart of a method for determining failure of the optical amplifier module equipped with the failure detection system of FIG. 6A.

Another performance parameter for obtaining information about functioning of a multiband amplifier is the control dynamic range. The embodiment that is used for such a measurement is illustrated in FIG. 6A for a two band amplifier and the mode of operation is illustrated in FIG. 6B, for a multiband amplifier.

If an optical amplifier with two bands, having somewhat independent power control, is unable to simultaneously obtain its provisioned output powers in both of its bands due to the control running out of dynamic range, the failure detection system compares first the two measured output values representative of the output power with the two provisioned output powers. The non-volatile memory 32 contains a three dimensional table that has dimensions of the first provisioned output power $P_1$, the second provisioned output power $P_2$, and the first input values $I_1$. The records in each location of the table are the maximum and the minimum powers for the second input $I_2$, namely $I_{2Min}$ and $I_{2Max}$, under those conditions.

An example of a table is given in the following, with only two values for $I_1$ shown for brevity:

TABLE

|  | POUT1<br>POUT2 | +3<br>I2(Max/<br>Min) | +6<br>I2(Max/Min) | +9<br>I2(Max/Min) | +12<br>I2(Max/Min) |
|---|---|---|---|---|---|
| $I_1 =$ | +3 | −7/3 | −6/6 | −5/7 | −5/9 |
| 0 dB | +6 | −6/3 | −5/6 | −4/8 | −4/9 |
|  | +9 | −5/3 | −4/6 | −4/9 | −3/11 |
|  | +12 | −4/3 | −3/6 | −3/9 | −2/12 |
| $I_1 =$ | +3 | −23/−10 | −24/17 | −24/−14 | −27/−16 |
| −15 dB | +6 | −20/−5 | −20/−8 | −20/−9 | −23/−10 |
|  | +9 | −16/0 | −15/0 | −16/−5 | −18/0 |
|  | +12 | −10/0 | −9/+1 | −9/+3 | −8/+5 |

The system measures the output power for the first and second transmission channels and provides the measured output values $O_1$ and $O_2$. A first comparator 34 receives on its inputs the measured output values O1 and O2 and compares them with the provisioned values P1 and P2 received from memory 32 on line 35.

If the output powers are out of the designed range for that amplifier, the first comparator 34 will issue the error signal 33 to the control unit 22 for initiating the verification of the inputs. The input power is then measured for the first and second channels to give the measured input values I1 and I2. The range $I_{2Min}$–$I_{2Max}$, corresponding to values $I_1$, $O_1$, and $O_2$ is retrieved from the table stored in memory 32. This record is input to a second comparator 36. Second comparator 36 also receives the measured input value $I_2$ from the second input power monitor and compares it with $I_{2Min}$ and $I_{2Max}$. If the power measured on the second input is within the range tabulated, then the amplifier is declared failed, with signal 41 indicating that the amplifier module is not functioning to its guaranteed performance level. If the power measured is outside the tabulated range, then a "control dynamic range" alarm is declared by the control unit on receipt of signal 43.

Hysteresis of, for example, 1 dB can be implemented to prevent excessive toggling of alarm states. Three dimensional interpolation can be used to provide better resolution than that chosen for the table step-size, which could be, for example, 2 dB. Polynomial fits or other methods of data reduction can be used instead of tables to require less storage at the cost of more processing.

With an amplifier having M bands, this method can be generalized by using a table of dimension 2*M−1. In this case, one of the inputs, which we will note as input $I_1$, has its range tabulated as a function of all of the others. As shown in FIG. 6B at step 600, the table $TAB^{2M-1}$ is stored in memory 32. The table has records of the form $I_{1Min}$–$I_{1Max}$. In step 610, the output power monitors are instructed by the control unit 22 to provide the measured output values for all M transmission channels. Next, in step 620, the measured output values are compared to the provisioned powers in the first comparator 34 to obtain the error signal 33. If the output powers are in the provisioned range for all outputs, steps 610 and 620 are repeated. If signal 33 is false, then the inputs are measured in step 630 to obtain the measured input values $I_1, \ldots I_M$ for all channels. In step 640 the memory is accessed and the record $I_{1Min}$–$I_{1Max}$ corresponding to the measured $O_1, \ldots O_M, I_2, \ldots I_M$ is retrieved from the table $TAB^{2M-1}$. In step 650 comparator 36 determines if the measured input value $I_1$ is in the range $I_{1Min}$–$I_{1Max}$. If $I_1$ is within the range, the module is declared failed, as shown in step 660. If the input is outside the range, the appropriate alarm is displayed in step 670.

In some cases this may not give a sufficient observation of the space of valid operation, and several such tables would be consulted, with different choices of variables. In other cases the tables can be of reduced dimension and several variables tabulated. These cases are determined by the control specifics of the particular amplifier and the accuracy desired.

Still another performance parameter for determining the failure of an amplifier module is the output loss. The output loss can be calculated in a manner similar to the above methods, using the gain values. According to this method, the gains $g_1$ and $g_2$ of the module at two wavelengths $\lambda_1$ and $\lambda_2$ are selected from the measured gains so as to have the greatest difference between the respective gain tilt coefficients $C_1$–$C_2$, for best accuracy. The average inversion is then determined according to the following relationship:

$$INV_2 = \frac{(g_1 - g_2) \cdot \alpha + \beta}{C_1 - C_2} \quad (EQ7)$$

where $\alpha$, $\beta$ are constants for a given amplifier design.

The expected additive ASE photon flux can be calculated by:

$$FASE_{calc} = (e^{A \cdot INV_2 - 1}) \cdot \gamma \quad (EQ8)$$

where A and $\gamma$ are constants for a given design.

The output loss is equal to the ratio:

$$\text{output loss} = \frac{FASE_{calc}}{FASE_{out} - FASE_{in}} \quad (EQ9)$$

Figure 7A:
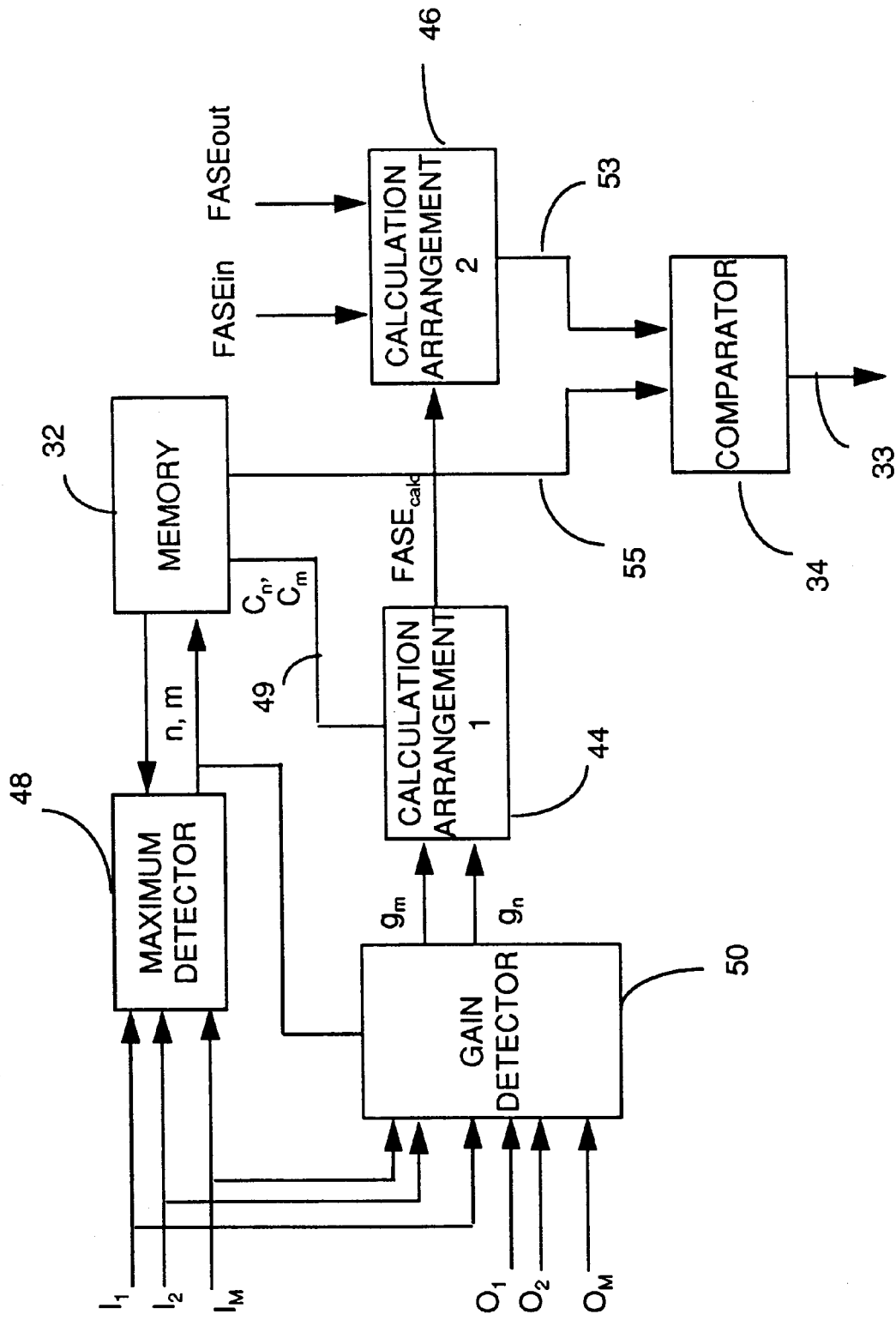
FIG. 7A shows a block diagram of a failure detection system according to yet another embodiment.

FIG. 7A shows a block diagram for a failure detection system using this parameter. The calibrated gain tilt coefficients $C_1$ to $C_M$ for all M transmission channels are determined at the factory and stored in memory 32. At predetermined intervals, the maximum detector 48 determines which transmission channels are active and determines channels "n" and "m" with the highest difference between the gain tilt coefficients. The current gains gn and gm being provided by the amplifier are measured for $\lambda_n$ and $\lambda_m$ in gain detector unit 50. A first calculation arrangement 44 receives the gain tilt coefficients $C_n$ and $C_m$ for these channels and the measured $g_n$ and $g_m$ and calculates $FASE_{calc}$. A second calculation arrangement 46 receives $FASE_{calc}$ and also the measured $FASE_{in}$ and $FASE_{out}$ and calculates signal output loss according to EQ9.

The output loss is compared to a calibration value of output loss that is stored in the non-volatile flash memory 32 at the factory and an output loss alarm is declared if the difference is beyond a given threshold.

Figure 7B:
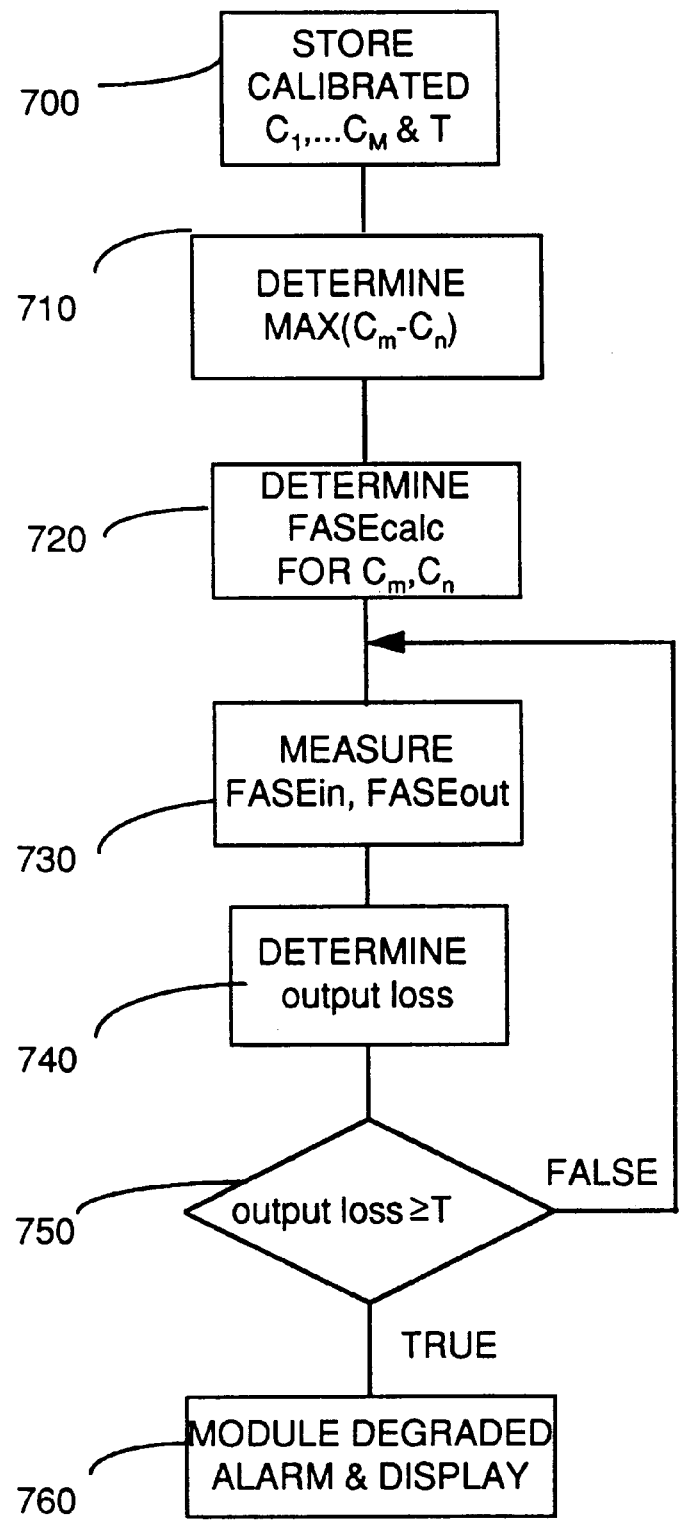
FIG. 7B is a flow chart of a method for determining failure of the optical amplifier module equipped with the failure detection system of FIG. 7A.

FIG. 7B illustrates a flow chart of the operations executed by the system for detecting failure of the amplifier module according to the embodiment of FIG. 7A. In step 700, the calibrated $C_1$ to $C_M$ and the calibration value T for the output loss are stored in memory 32. Detector 48 determines, out of all active transmission channels, the channels (n) and (m) presenting a maximum difference between the gain tilt coefficients in step 710. Next, $FASE_{calc}$ is calculated in the first calculation arrangement 44 for the channels selected by detector 48. In step 730, the ASE for the input and output are measured by the amplifier module and these values are used to calculate the output loss in step 740. Next, the output loss is compared with the calibration value T in step 750 and the alarm block 38 is triggered in step 760 by the error signal when the output loss is higher than the calibration value.

Furthermore, a model of the amplifier can be computed within the microprocessor and the performance of that amplifier compared to the model results. This can be made computationally efficient by condensing the amplifier model to a set of polynomials. The amplifier parameters could be transmitted to a separate or central computer and the evaluation of those parameters calculated there. The amplifier module may be provided with some or all the above disclosed embodiments, by addition of a minimal number of components and software.

While the invention has been described with reference to particular example embodiments, further modifications and improvements which will occur to those skilled in the art may be made within the purview of the appended claims, without departing from the scope of the invention in its broader aspect.

What is claimed is:

1. A failure detection system for an optical amplifier module, comprising:

means for measuring a performance parameter of said module;

a memory unit for providing a predetermined expected performance parameter;

a comparator unit for receiving said performance parameter and said expected performance parameter and producing an error signal when said performance parameter departs from said expected performance parameter; and a display/alarm unit for receiving said error signal and accordingly signaling a failure of said module.

2. A failure detection system for an optical amplifier module, comprising:

means for measuring a performance parameter of said module;

a memory unit for providing a predetermined expected performance parameter; and a comparator unit for receiving said performance parameter and said expected performance parameter and producing an error signal when said performance parameter departs from said expected performance parameter, wherein said means for measuring further comprises:

means for supplying an input value as a function of the power of an incoming optical signal received by said amplifier module on a transmission channel; and means for supplying an output value as a function of the power of an outgoing optical signal transmitted by said amplifier module on said transmission channel.

3. A failure detection system for an optical amplifier module, comprising:

means for measuring a performance parameter of said module;

a memory unit that stores an expected performance parameter; and a comparator unit for receiving said performance parameter and said expected performance parameter and producing an error signal when said performance parameter departs from said expected performance parameter, wherein said means for measuring further comprises:

means for supplying an input value as a functions of the power of an incoming optical signal received by said amplifier module on a transmission channel; and means for supplying an output value as a function of the power of an outgoing optical signal transmitted by said amplifier module on said transmission channel; and wherein said comparator unit comprises:

a first comparator for comparing said output value with a provisioned output value stored in said memory unit and producing said error signal; and a second comparator for comparing, in response to said error signal, said input value to a threshold stored in said memory unit and producing one of a module fail alarm signal and input low alarm signal.

4. A failure detection system for an optical amplifier module, comprising:

means for measuring a performance parameter of said module;

a memory unit that stores an expected performance parameter; and a comparator unit for receiving said performance parameter and said expected performance parameter and producing an error signal when said performance parameter departs from said expected performance parameter, wherein said means for measuring further comprises:

means for supplying an input value as a function of the power of an incoming optical signal received be said amplifier module on a transmission channel;

means for supplying an output value as a function of the power of an outgoing optical signal transmitted by said amplifier module on said transmission channel;

means for estimating the amplified spontaneous emission (ASE) value;

means for supplying a pump power value as a function of the power injected by a laser pump of said amplifier module on said transmission channel; and a calculation unit for receiving said input value, said output value, said ASE value, and said pump power value and determining a figure of merit as said expected performance parameter.

5. A failure detection system for a multi-channel optical amplifier module having a plurality (M) of transmission channels, comprising:

means for measuring a performance parameter of said module;

memory for storing a predetermined expected performance parameter; and a comparator unit for comparing said performance parameter with said expected performance parameter and producing an error signal when said performance parameter departs from said expected performance parameter.

6. A failure detection system as claimed in claim 5, further comprising a display/alarm unit for receiving said error signal and accordingly indicating a failure of said module.

7. A failure detection system for a multi-channel optical amplifier module having a plurality (M) of transmission channels, comprising:

means for measuring a performance parameter of said module;

a memory unit for storing an expected performance parameter; and a comparator unit for comparing said performance parameter with said expected performance parameter and producing an error signal when said performance parameter departs from said expected performance parameter, wherein said means for measuring comprises:

means for supplying an input value ($I_m$) for each transmission channel (m) as a function of the power of an incoming optical signal received by said amplifier module on said transmission channel (m), where m is an integer m∈[1,M]; and means for supplying an output value ($O_m$) for each transmission channel (m), as a function of the power of an outgoing optical signal transmitted by said amplifier module on said transmission channel (m).

8. A failure detection system as claimed in claim 7, wherein said means for measuring further comprises:

a first calculation arrangement for receiving said (M) output values and determining a combined measured output value F(O); and a second calculation arrangement for receiving said (M) input values and determining a combined measured input value J(I).

9. A failure detection system as claimed in claim 8, wherein said comparator unit comprises:

a first comparator for comparing said combined measured output value F(O) with a combined provisioned output value stored in said memory unit and producing said error signal; and a second comparator for comparing, in response to said error signal, said combined input value with a threshold (T) stored in said memory unit and generating one of a module fail alarm signal and input low alarm signal.

10. A failure detection system as claimed in claim 7, wherein said means for measuring comprises:

a minimum detector for determining a first transmission channel (n) having the minimum wavelength;

means for determining a first gain ($g_m$) and a second gain (gn), said first and second gains being calculated as a function of the ratio between said output and said input values for said respective transmission channels (m) and (n);

a first calculation arrangement for receiving said second gain $g_n$, and receiving from said memory unit a corresponding calibrated gain $G_n$, and calibrated gain tilt coefficients $C_n$ and $C_m$ for said transmission channels (n) and (m) respectively, calculating a first term as a difference ($g_n$–$G_n$), and adjusting said difference according to the ratio $C_n/C_m$; and a second calculation arrangement for receiving said gain $g_m$, receiving from said memory unit a corresponding calibrated gain $G_m$, and calculating a second term as a difference ($g_m$–$G_m$).

11. A failure detection system as claimed in claim 10, where said comparator unit compares said adjusted first term with said second term.

12. A failure detection system as claimed in claim 7, wherein said means for comparing comprises:

a first comparator for receiving said measured output value ($O_m$) and comparing each output value with a corresponding provisioned output value ($P_m$) and accordingly generating said error signal; and a second comparator for comparing, in response to said error signal, said input value $I_1$ with a record $I_{1Max}$, $I_{1Min}$ extracted from said memory means, and generating one of a module fail alarm signal and a fault alarm signal.

13. A failure detection system as claimed in claim 7, wherein said means for measuring comprises:

means for detecting a plurality of gain values ($g_m$), each representing the ratio between the power of an outgoing optical signal and the power of a corresponding incoming optical signal for a respective transmission channel (m);

means for extracting from said memory a plurality (M) of calibrated gain tilt coefficients for all said transmission channels;

a maximum detector for identifying a pair of channels (n) and (m) having a maximum difference between the respective gain tilt coefficients;

a first calculation arrangement for receiving said gain values ($g_n$) and ($g_m$) and calculating an ASE value ($FASE_{calc}$); and a second calculation arrangement for receiving said ASE value ($FASE_{calc}$), an input ASE value, measured in said incoming optical signal and an output ASE value measured in said outgoing optical signal and producing an output loss signal.

14. A failure detecting system as claimed in claim 13, wherein said comparator unit comprises a comparator for receiving said output loss signal and a target output loss signal from said memory means and accordingly producing said error signal.

15. A method for detecting failure of an optical amplifier module, comprising the steps of:
providing a predetermined expected performance parameter for said module;
measuring a performance parameter of said module;
comparing said performance parameter with said expected performance parameter to generate an error signal when said performance parameter is different from said expected performance parameter; and
triggering an alarm/display unit with a true/false signal for accordingly indicating a failure of said module.

16. A method for detecting failure of an optical amplifier module, comprising the steps of:
providing an expected performance parameter for said module;
measuring a performance parameter of said module;
comparing said performance parameter with said expected performance parameter to generate an error signal when said performance parameter is different from said expected performance parameter; and
triggering an alarm/display unit with a true/false signal for accordingly indicating a failure of said module,
wherein said step of measuring comprises:
measuring, for a plurality (M) of transmission channels, an input value $I_m$, representative of the power of an incoming optical signal on each transmission channel (m); and
measuring, for said plurality (M) of transmission channels, an output value representative of the power of an outgoing optical signal on each transmission channel (m).

17. A method as claimed in claim 16, wherein said performance parameter is said output value, and said expected performance parameter is a provisioned output value for said transmission channel (m).

18. A method as claimed in claim 16, wherein said performance parameter is a correspondence between said output value and said input value, and said expected parameter is a correspondence between a provisioned output value and a threshold for a transmission channel (m).

19. A method as claimed in claim 16, wherein said performance parameter is a correspondence between a combined input value and a combined output value for all said (M) transmission channels, and said expected performance parameter is a correspondence between a threshold and a combined provisioned output value.

20. A method as claimed in claim 16, wherein said performance parameter is a figure of merit ($FOM^{t=t}$) and said expected performance parameter is a provisioned figure of merit ($FOM^{t=0}$).

21. A method as claimed in claim 20, wherein said step of measuring comprises:
determining an input photon flowrate $FSIGI_n$ for a transmission channel (n) from said input value;
determining an output photon flowrate $FSIGO_n$ for said transmission channel (n) from said output value;
measuring a pump value representative of the power of a laser pump and determining a value $FPUMP_{in}$;
measuring the value of ASE detected in an incoming optical signal and determining a value $FASE_{in}$; and
measuring the ASE detected in an outgoing optical signal and determining a value $FASE_{out}$.

22. A method as claimed in claim 21, wherein said step of measuring further comprises calculating said figure of merit using the formula:

$$FOM = 1 - \frac{FPUMP_{in} + 2 \cdot (FASE_{in} - FASE_{out}) + \sum_n^M (FSIGI_n - FSIGO_n)}{\sum_n^M FSIGI_n + FPUMP_{in} + FASE_{in}}$$

23. A method as claimed in claim 21, wherein said step of measuring further comprises calculating said figure of merit using the formula:

$$FOM2_n = \frac{(FASEout - FASEin) \cdot FSIGI_n}{FSIGO_n}$$

24. A method as claimed in claim 16, wherein said performance parameter is a gain tilt error ($e_m$) and said expected performance parameter is an error threshold.

25. A method as claimed in claim 24, wherein said step of measuring comprises:
determining a gain ($g_m$) for a transmission channel (m) as a ratio between said output value and said input value for each transmission channel; and
determining a transmission channel (n) with the smallest wavelength.

26. A method as claimed in claim 25, wherein said step of providing an expected performance parameter comprises:
establishing by calibrated measurement an expected gain $G_m$ for each transmission channel (m);
measuring a gain tilt coefficient $C_m$ defining the expected relative change in said gain $G_m$; and
storing said expected gains, said gain tilt coefficients, and said error threshold in a memory unit.

27. A method as claimed in claim 26, wherein said step of measuring further comprises calculating said gain tilt error according to the formula:

$$e_m = (g_m - G_m) - (gn - G_n) \times (C_m / C_n).$$

28. A method as claimed in claim 25, wherein said step of providing an expected performance parameter comprises:
establishing by calibrated measurement an expected gain $G_m$ for each transmission channel (m) and determining an expected gain $G_0$ using the least square best fit method;
measuring a gain tilt coefficient $C_m$ defining the expected relative change in said expected gain $G_m$; and
storing said expected gains and said gain tilt coefficients for all transmission channels in a memory unit.

29. A method as claimed in claim 28, wherein said step of measuring further comprises:
determining a performance gain $g_0$ using the least square best fit method; and
calculating said gain tilt error according to the formula:

$$e_m = (g_m - G_m) - (g_0 - G_0) \times C_m$$

30. A method as claimed in claim 16, wherein said performance parameter is a dynamic range value and said expected performance parameter is an expected dynamic range value.

31. A method as claimed in claim 30, wherein said step of providing said performance parameter comprises:

configuring a 2(M−1) dimension table, where a first dimension ($P_m$) represents a provisioned output value, a second dimension ($T_m$) represents a threshold, and a record ($I_{1Max}$, $I_{1Min}$) represents a range for said input value for a transmission channel (1) and (m) represents a transmission channel m∈[2,M]; and storing said table in a memory unit.

32. A method as claimed in claim 31, wherein said step of comparing comprises:

extracting from said memory unit said record corresponding to all said input values for transmission channels (n), where n∈[2,M]; and also corresponding to all said output values for transmission channels (m), where m∈[1,M]; and comparing said input value for said transmission channel (1) with said record.

33. A method as claimed in claim 16, wherein said performance parameter is an output loss and said expected performance parameter is calibrated output loss.

34. A method as claimed in claim 33, wherein said step of measuring comprises:

establishing by calibrated measurement an expected gain $G_m$ and calculating a gain tilt coefficient $C_m$ defining the expected relative change in said expected gain $G_m$ for each transmission channel (m); and storing said gain tilt coefficients for all transmission channels in a memory unit.

35. A method as claimed in claim 34, wherein said step of measuring comprises:

determining a gain ($g_m$) for a transmission channel (m) as a ratio between said output and said input values for all (M) transmission channels;

determining a pair of transmission channels (n,m) with the largest difference between said respective gain tilt coefficients; and calculating an expected additive ASE photon flux according to the formula:

$$FASE_{calc} = (e^{A \cdot INV_2} - 1) \cdot \gamma;$$

where $$INV_2 = \frac{(g_2 - g_2) \cdot \alpha + \beta}{C_1 - C_2}$$

and $\alpha$, $\beta$, $A$ and $\gamma$ are constants are constants characterizing said amplifier module.

36. A method as claimed in claim 35, wherein said step of measuring further comprises calculating said output loss error according to the formula:

$$\text{output loss} = \frac{FASE_{calc}}{FASEout - FASEin}$$

* * * * *